(12) United States Patent
Goossens et al.

(10) Patent No.: US 7,454,170 B2
(45) Date of Patent: Nov. 18, 2008

(54) UNIDIRECTIONAL POWER AND BI-DIRECTIONAL DATA TRANSFER OVER A SINGLE INDUCTIVE COUPLING

(75) Inventors: Hendrikus Martinus Wilhelmus Goossens, Eindhoven (NL); Gerardus Lucien Mathildus Jansen, Eindhoven (NL); Peter H. J. Van Den Bosch, Boekel (NL); Alexander Molenaar, Kamerik (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 202 days.

(21) Appl. No.: 10/567,210

(22) PCT Filed: Aug. 2, 2004

(86) PCT No.: PCT/IB2004/051353
§ 371 (c)(1),
(2), (4) Date: Feb. 3, 2006

(87) PCT Pub. No.: WO2005/015766
PCT Pub. Date: Feb. 17, 2005

(65) Prior Publication Data
US 2006/0252370 A1 Nov. 9, 2006

(30) Foreign Application Priority Data
Aug. 8, 2003 (EP) .................................. 03102478

(51) Int. Cl.
*H04B 5/00* (2006.01)
*H04B 7/00* (2006.01)
*H04Q 7/00* (2006.01)
*G06F 17/50* (2006.01)
*H03K 17/693* (2006.01)

(52) U.S. Cl. .................... 455/41.1; 455/41.3; 455/500; 716/15

(58) Field of Classification Search ................ 455/41.1, 455/41.3, 500, 502; 716/15
See application file for complete search history.

(56) References Cited

U.S. PATENT DOCUMENTS
4,788,448 A * 11/1988 Crowe .......................... 307/31
(Continued)

FOREIGN PATENT DOCUMENTS
DE 19542214 C1 3/1997
(Continued)

OTHER PUBLICATIONS

International Search Report of International Application No. PCT/IB2004/051353 Contained in International Publication No. WO2005015766.
(Continued)

*Primary Examiner*—Nay Maung
*Assistant Examiner*—Andrew Wendell

(57) ABSTRACT

An inductive transmission system for inductive transmission of power and full duplex data signals between first and second devices. The transmission system includes a bi-directional inductive channel between the two devices; a transmitter for transmitting a power signal at a first frequency from the first device to the second device over the inductive channel; a first modulating device for modulating a first data signal at a first modulation frequency; and a second modulating device for modulating a second data signal at a second modulation frequency. Further transmitters transmit the modulated first data signals from the first device to the second device over the inductive channel, and transmits the modulated second data signals from the second device to the first device over the inductive channel. The first modulation frequency and the second modulation frequency are at least a factor two apart.

14 Claims, 8 Drawing Sheets

U.S. PATENT DOCUMENTS

| | | | |
|---|---|---|---|
| 5,293,400 A | 3/1994 | Monod et al. | |
| 5,701,121 A | 12/1997 | Murdoch | |
| 5,774,791 A * | 6/1998 | Strohallen et al. | 455/41.1 |
| 5,841,122 A | 11/1998 | Kirchhoff | |
| 5,856,710 A | 1/1999 | Baughman et al. | |
| 5,913,171 A * | 6/1999 | Solonen et al. | 455/502 |
| 6,173,899 B1 | 1/2001 | Rozin | |
| 6,285,864 B1 * | 9/2001 | Ruemmer et al. | 455/265 |
| 6,499,701 B1 | 12/2002 | Thornton et al. | |
| 6,741,845 B1 * | 5/2004 | Poletto et al. | 455/238.1 |
| 6,766,141 B1 * | 7/2004 | Briles et al. | 455/40 |
| 7,158,754 B2 * | 1/2007 | Anderson | 455/41.1 |
| 7,228,182 B2 * | 6/2007 | Healy et al. | 607/60 |
| 2003/0156370 A1 * | 8/2003 | Yokoo | 361/62 |

FOREIGN PATENT DOCUMENTS

| | | |
|---|---|---|
| GB | 2129138 A | 5/1984 |
| GB | 2153410 A | 8/1985 |
| WO | WO9507521 A1 | 3/1995 |
| WO | WO9723060 A1 | 6/1997 |

OTHER PUBLICATIONS

Written Opinion of the International Searchng Authority for International Publication No. PCT/IB2004/051353.

* cited by examiner

UNIDIRECTIONAL POWER AND BI-DIRECTIONAL DATA TRANSFER OVER A SINGLE INDUCTIVE COUPLING

The present invention relates to a signal transmission method and device, more particularly to a method and a device for inductively transferring energy and data between a stationary part and a moving part, i.e. without the need for mechanical contact between the stationary part and the moving part.

In an increasing number of applications, electrical power and data need to be transferred on and off moving, for example rotating, equipment, and interfaced to stationary equipment, such as e.g. a PLC or a PC. Examples of such applications can be found in automotive devices, wireless energy transfer systems, remote measuring systems, and the like.

Traditionally, slip rings with moving sliders were specified to deal with unrestricted rotational movement. However, slip rings suffer from frictional wear, causing noise, loss of data transfer or system failure.

It has long been known that energy and data can be transmitted inductively via coils, which corresponds essentially to a transformer with a corresponding air gap.

From Paul Vahle GmbH (www.vahle.de/vahle_e.html) a contactless power system (CPS) is known. CPS supplies electrical current by means of electromagnetic induction, similar to the primary-to secondary energy conversion of a transformer. However, contrary to a typical transformer, the CPS transformer stretches the primary winding into a long loop and places the secondary winding on an open-end core which surrounds the primary conductors and allows relative movement between the two. CPS may be combined with the Vahle slotted microwave guide (SMG) data transmission system. This means that there is a separate inductive path for power and a separate data path via a wave guide.

WO 95/07521 describes an inductive transmission system for a probe. The probe is connected via a probe interface to a first coil. This first coil is inductively coupled across a small gap to a second coil, which is connected via an interface circuit to the machine control. Data signals pass from the probe to the interface. Simultaneously, a power carrier signal and a command signal pass from the interface to the probe. In order for each signal to pass without mutual interference, each signal has a carrier of a different central frequency, and the signals are carried in frequency bands which do not overlap, which, according to this prior art document, is necessary for signal generation and recovery. Signals are modulated using a modulation system with a constant amplitude.

In this system, the data rate in the command band is very low. It is not possible to have two equally fast transmitting data streams simultaneous in two directions.

It is an object of the present invention to provide a signal transmission system and method of operating the same which provides full duplex data traffic at high data rates in both directions over one single interface. A further aim of the present invention is that both channels can have continuous traffic without interference. A further aim is to transmit power over the same interface.

The above objective is accomplished by a method and device according to the present invention.

The present invention provides an inductive transmission system for inductive transmission of power and full duplex data signals between a first device and a second device. The transmission system comprises:

a bidirectional inductive channel between the first device and the second device, first transmission means for transmitting a power signal at a first frequency from the first device to the second device over the inductive channel, a first modulating device for modulating a first data signal at a first modulation frequency, a second modulating device for modulating a second data signal at a second modulation frequency, second transmission means for transmitting the modulated first data signals from the first device to the second device over the inductive channel, and for transmitting the modulated second data signals from the second device to the first device over the inductive channel, wherein the first modulation frequency and the second modulation frequency are at least a factor two apart and preferably an even factor apart, and wherein the transmission system furthermore comprises detection means for demodulating the first data signal and the second data signal on the first device side respectively on the second device side, and signal cancellation means for cancellation of the first data signal respectively second data signal from the transmitted second data signal respectively from the transmitted first data signal at the first device side respectively at the second device side. The signal cancellation means or compensation circuit for compensating for the sent data signal provides a full duplex path without interference from the own sent signals at a device side.

The first modulating device and the second modulating device may be suitable for performing amplitude modulation. Alternatively they may be suitable for performing phase or frequency modulation.

The detection means may be synchronous detection means. Such synchronous detection system additionally improves the distinction between different signals, and the performance of the system.

According to the present invention, the first frequency may be a factor 10 or more apart from the first and second modulation frequency.

The first transmission means may comprise a first coil at the first device side and a first coil at the second device side. The second transmission means may comprise a second coil at the first device side and a second coil at the second device side.

The present invention also provides a method for inductive transmission of power and full duplex data signals between a first device and a second device. The method comprises:

transmitting power signals from the first device to the second device at a first frequency over an inductive channel, transmitting first data signals modulated at a second frequency from the first device to the second device over the inductive channel, and transmitting second data signals modulated at a third frequency from the second device to the first device over the inductive channel, the second and third frequency being at least a factor two and preferably an even factor apart, demodulating the first data signal and the second data signal on the first device side respectively second device side, and cancellation of the first data signal respectively second data signal from the transmitted second data signal respectively transmitted first data signal at the first device side respectively second device side.

A method according to the present invention may comprise amplitude modulating the first data signals and the second data signals before transmission.

Demodulating the first data signal and the second data signal may comprise performing synchronous detection.

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
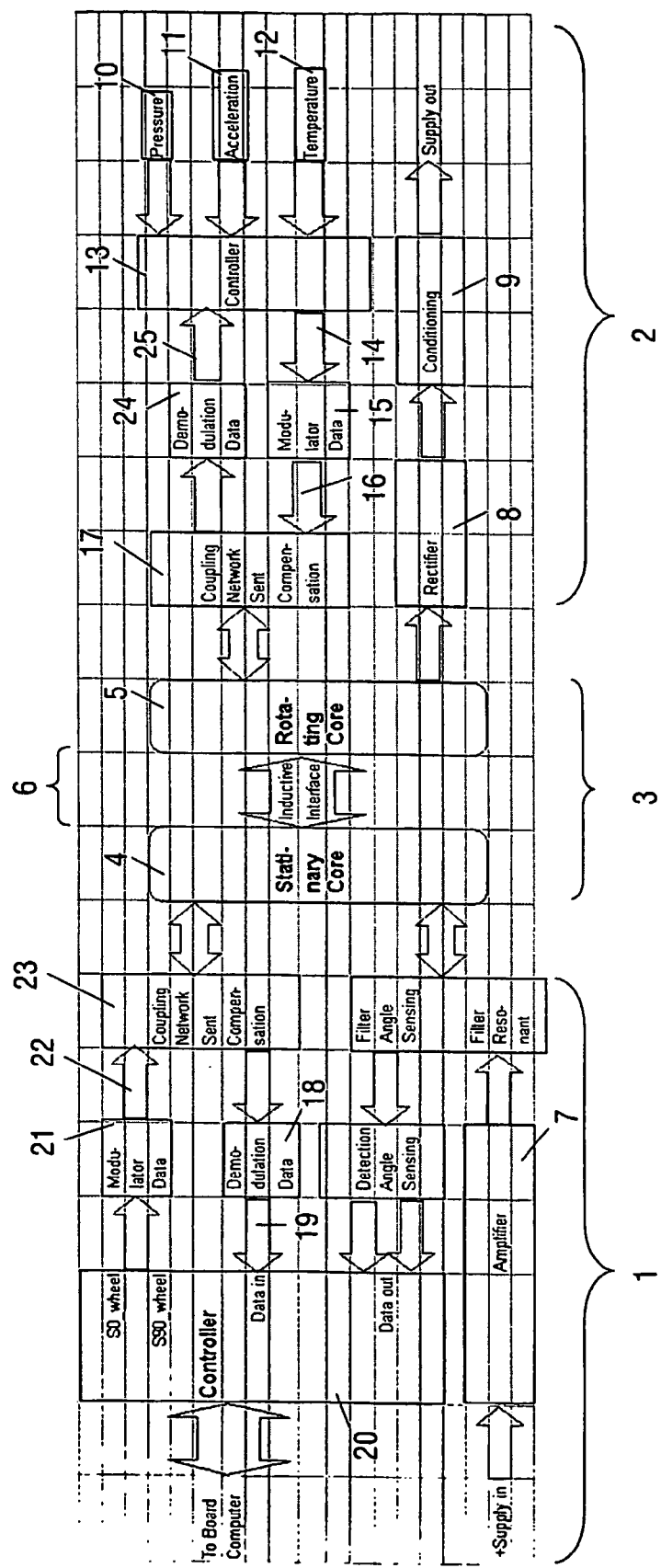
FIG. 1 is a schematic block diagram of a full duplex data and power transmission system according to an embodiment of the present invention.

In the different drawings, the same reference figures refer to the same or analogous elements.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

A system according to the present invention is intended to transfer information to and from a first device, such as a moving, for example rotating, device, to and from a second device, for example a stationary device. The first device may be a slave device and the second device a master device. The present invention is not limited to one of the devices being moving and one stationary. For example, both could be stationary or both moving. Merely, for ease of understanding, in the present description the master device is referred to as a stationary device, and the slave device is referred to as a moving device. As indicated above, the invention is not limited thereto. The master device is the device from which power is transmitted to the slave device. If the rotating device would be for example battery powered, the moving device could be the master device, while the stationary device is then the slave device.

The rotating device can for example be a wheel on an automobile, or any part thereof, such as for example the tire, the rim and/or a part of the bearing. In that case, the stationary device may be an electronic control system in the car, for example a board computer. Data from the rotating device, like sensor data, are transferred to the fixed or stationary device. Such sensors can be any suitable sensor of a physical property, for example temperature, pressure or accelerator sensors or any form of transducer or transponder. The rotating part of the transmission system according to the present invention has to be supplied with power for the sensors and for example to processing electronics on the second device. A powerful processing system may be provided at the moving part of the transmission system in order to reduce or compress the amount of data coming from the various sensors. The sensors may be sampled, for instance, at frequencies around a few kHz, with resolutions of approximately 10 bits. The high data rates of all these sensors together requires a certain bandwidth in the connection to the stationary world. Bandwidth is often limited. Hence, processing electronics may be provided for reducing the data stream to a lower acceptable data rate. According to the prior art an acceptable data rate was 10 to 100 kb/s. According to e.g. an automotive application in case of the present invention, a data rate of at least 100 kb/s may be needed, and a data rate of 1 Mb/s may be desirable.

Since the power required on the moving part may be a number of watts (required for the processing electronics) the present invention provides, in one aspect, an inductive coupling, that is a contact-less coupling which can transfer such amounts of energy. Power transfer is provided by a transformer-type coupling with an air gap. For the data transfer, a reliable contactless transfer medium is provided. This can also be provided in an inductive coupling, which provides the advantages of reliability and low complexity. Preferably, the data transfer and power transfer are combined in one and the same inductive coupling. This leads to a reliable and low complexity of the total system, and particularly to a low complexity of the coupler.

A block diagram of a system according to an embodiment of the present invention is shown schematically in FIG. 1. The left part of the diagram is the stationary part 1 of the transmission system, which is connected to the stationary device, e.g. to the board computer of a car. The right part of the diagram is the moving part 2, and is located on the moving device, e.g. on one of the wheels.

Figure 10:
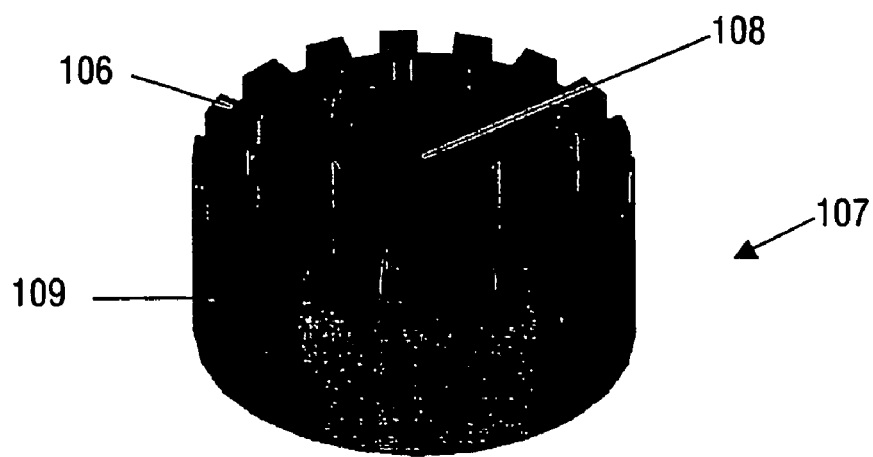
FIG. 10 illustrates a toothed core for use in a transmission system according to an embodiment of the present invention.

Between the stationary part 1 and the moving part 2 is provided an inductive coupling device 3 with two cores, for example ferrite cores, a stationary core 4 and a rotating core 5 and two sets of coils (not represented in FIG. 1 but represented in FIG. 10). A first set 121 of coils, comprising a first stationary coil 122 and a first moving coil 123 is used for power transfer, and the second set 124 of coils, using a second stationary coil 125 and a second moving coil 126 is used for full duplex data transfer. The first and second stationary coils 122, 125 are located at the stationary device side, and the first and second moving coils 123, 126 are located at the moving device side of the inductive coupling device 3. There is an air gap 6 between the two cores 4, 5 and thus also between the respective stationary and moving coils. The transferred energy in a system according to the present invention is in the order of milliwatts or Watts.

Power Transmission

The stationary part 1 of a transmission system according to an embodiment of the present invention comprises a power amplifier 7. A sinusoidal generator at a first frequency, which is a relatively low frequency, e.g. between 10 and 500 kHz, possibly up to 1 MHz, for example at 20 kHz drives a linear power amplifier with the signal indicated with "+Supply in" in FIG. 1. For use in automotive applications the power supply in the stationary part may be powered by a DC voltage, e.g. from a car battery but the present invention is not limited to DC power supplies.

In a preferred embodiment, the power amplifier 7 may exist of two stages, one for amplifying the positive parts of the sinusoidal signal, the other for amplifying the negative parts of the sinusoidal signal. So one amplifier stage is set up as a non-inverting amplifier, while the other amplifier stage is set up as an inverting amplifier. Each amplifier stage drives one side of the power coil 122. Together the amplifier stages operate as a push-pull drive stage. The amplifier 7 is supplied with a single supply voltage +Supply in, for example having a value of +12 V. Due to losses in the amplifier stages, the amplifier 7 generates voltages less than 12 V, e.g. up to 8V peak. In order to slightly increase the efficiency at the first frequency, e.g. 20 kHz, the coil 122 may have a resonant capacitor in parallel or in series.

The power amplifier 7 drives the first stationary coil 122 at the stationary part 1 at the first, relatively low frequency, e.g. at 20 kHz. This generates an alternating magnetic field in the air gap 6 of the inductive coupling device 3. At this frequency, a transformer system with an air gap in the order of 0.5 mm is sufficiently efficient.

This alternating magnetic field is transferred to a power pick-up coil on the moving part 2, which is the first moving coil 123. The power coil 123 on the moving part is equipped with a centre tap 127. This centre tap 127 is grounded and the other taps 128, 129 drive a full-wave bridge in a rectifier 8. The rectifier bridge is set up with Shottky diodes with low voltage drop. Via this arrangement a positive voltage and a negative voltage can be generated at the moving part 2. The voltage on the moving coil 123, rectified by means of the rectifier 8, is then conditioned by means of conditioning means 9, e.g. to remove ripple on the output DC voltage. For example, smoothing capacitors can be provides and a subsequent stabiliser so as to generate a DC voltage suitable as a power supply voltage for optional electronic equipment on the moving part 2. For the stabilisation on the positive side a parallel stabiliser is used in order to minimise the voltage losses.

Data Transmission from Slave to Master

On the moving part 2, a number of sensors, for example, but not limited thereto, a pressure sensor 10, an acceleration sensor 11 and a temperature sensor 12, may generate signals which are converted by a controller 13 into a digital data stream 14. The bit rate may be between 10 kb/s and 1 Mb/s, preferably between 100 kb/s and 1 Mb/s, for example the bit rate may be set at 128 kb/s.

This data stream 14 can be modulated, for example on/off amplitude modulated in a first modulating device 15 at a first modulation frequency, which is a high frequency of for example 1.5 MHz. The first modulation frequencies have to be at least a factor 5 higher than the power frequency, which, as said before, can be from very low up to 500 kHz or possibly even 1 MHz. In principle the first modulation frequencies can be up to 10 or 20 MHz, depending on the coupler construction (air gap, number of windings, type of ferrite material used etc.). In principle other types of modulation, such as frequency or phase modulation, could be used, but these modulation methods have a more complex demodulation and modulation circuitry.

The first modulation frequency is at least a factor 5 higher than the first frequency of the power signal.

The incoming signal of the modulating device 15 is a serial TTL-type data stream. This data stream turns a 1.5 MHz driver on and off depending on a high or low level. The 1.5 MHz carrier signal may for example be obtained from a 6 MHz clock signal which is divided by 4.

The coupling of the modulated data signal 16 to the moving data coil 126 is done via a coupling network 17 comprising a high-pass filter at a filter frequency intended to eliminate the power frequency and its harmonic components out of the data channel. The high-pass filter frequency is thus located between the power frequency and the data frequencies, e.g. approximately 500 kHz. The power frequency components are eliminated and the data frequency components are passed through the high-pass filter. Finally the modulated signal 16 drives the data coil 126 on the moving part 2. The magnetic field in the air gap 6 in the inductive coupling device 3 is modulated at the first modulation frequency, in the example described 1.5 MHz.

The data coil 125 on the stationary part 1 receives the modulated magnetic field in the air gap 6 and converts it, for example, to a voltage. This voltage is demodulated in a demodulation device 18, and converted back into a digital data stream 19. This data stream 19 may be fed to a controller 20, and for example to the board computer (not represented) of the car.

Data Transmission from Master to Slave

Data from the stationary part 1 to the moving part 2, such as for example command signals such as S0_wheel and S90_wheel, are modulated, for example on/off amplitude modulated, in a modulating device 21 at a second modulation frequency, which is a factor 10 or more higher than the first frequency, and which is an even factor higher than the first modulation frequency. An even factor is preferred, because odd factors are less optimal as they result in more interference. A factor 2 gives a nice separation of the two data frequencies. Also a factor 4 or 6 are possible, but in that case more channel bandwidth is required. If only a small channel bandwidth is available, a factor 2 separation is preferred.

For the example described herein, the second modulation frequency is for example 3 MHz. The bit rate of the data stream is set at e.g. 128 kb/sec. The incoming signal in the modulation device 21 is a serial TTL (transistor-transistor logic)-type data stream. This data stream modulates a driver at the second modulation frequency, e.g. 3 MHz, on and off depending on a high or low level of the incoming data. The 3 MHz may be obtained from a 6 MHz clock signal which is divided by 2, giving a duty cycle of exactly 50%. The modulated data stream 22 is coupled to the stationary data coil 125 via a coupling network 23 comprising a high-pass filter at a filter frequency intended to eliminate the power frequency and its harmonic components out of the data channel, e.g. at a filter frequency of approximately 500 kHz.

Via the coil 125 at the stationary part 1, the signal at the second modulation frequency, e.g. the 3 MHz signal, is translated to a magnetic field modulation at this same frequency in the air gap 6.

The data coil 126 on the moving part 2 receives the modulated magnetic field in the air gap 6 and converts it to a voltage. This voltage is demodulated in a demodulation device 24, and converted back into a digital data stream 25. This data stream 25 may be fed to controller 13.

Sent Signal Cancellation

On the moving part 2, the signal at the second modulation frequency, e.g. the 3 MHz signal, is received by the data coil 126 at that side. This coil 126 is also the driving coil for the data from the moving part to the stationary part 1. Due to the heavy signal loss over the transmission channel (inductive coupling device 3) the received signal at the second modulation frequency, 3 MHz, is dominated by the secondary data signal at the first modulation frequency, 1.5 MHz. The received 3 MHz signal is more than a factor 10 smaller in amplitude than the sent 1.5 MHz signal.

Likewise, the coil 125 receiving the signal at the first modulation frequency, e.g. the 1.5 MHz signal, at the stationary part 1 is also the driving coil for data, such a command signals for example, coming from the stationary part 1 and being sent to the moving part 2. Due to heavy signal loss over the transmission channel of the inductive coupling device 3, the signal received at the data stationary coil 125, e.g. the 1.5 MHz signal, is dominated by the data signal at the second modulation frequency to be sent by the stationary part 1, e.g. the 3 MHz. The received 1.5 MHz signal is more than a factor 10 smaller in amplitude than the sent 3 MHz signal.

Therefore, at both sides of the inductive coupling device 3, the sent signal is cancelled from the received signal. For example, the present invention includes the use of echo cancellers or filters to remove or suppress the unwanted signal from the received signal. An embodiment of the present invention is explained hereinafter for sent signal cancellation at the stationary part. The sent signal cancellation at the moving part is not explained in detail, but is analogous.

Figure 2:
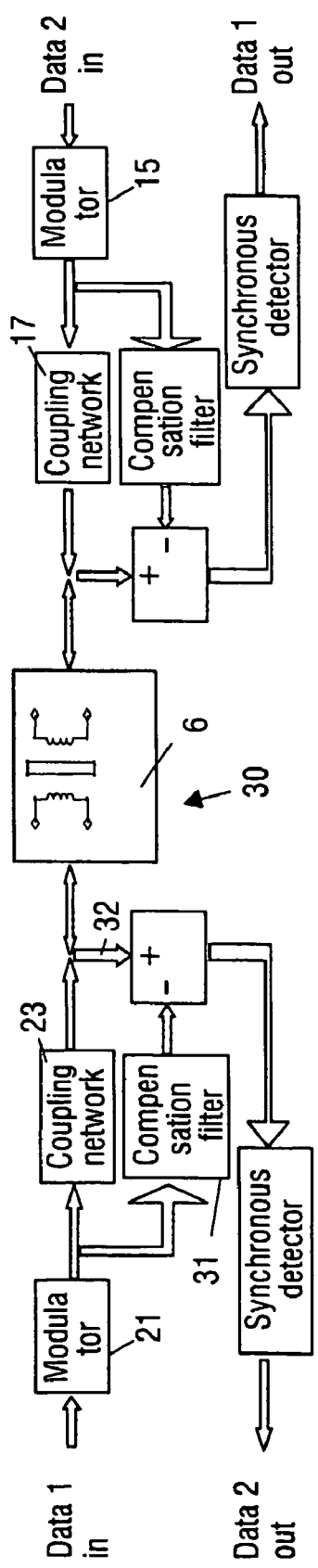
FIG. 2 shows a schematic block diagram of a compensation circuit for cancelling of sent data in the received signal according to an embodiment of the present invention.

FIG. 2 shows the compensation circuit 30 for the sent data signal. With no compensation for the sent data signal, the signal received at one side would be dominated by the signal sent at that side. The data signal is attenuated up to a factor 10 by the inductive transmission channel. The own sent signal would then be ten times as large as the signal received from the other side. In order to eliminate the own sent signal in the received signal, a compensation is necessary.

The transfer from Data-1-in to the coupling to the channel has a certain frequency transfer characteristic. This frequency transfer characteristic has to be used in case of compensation of the own signal. So for this compensation the data enters not only the coupling network 23, but also a compensation filter 31. The output of this compensation filter 31 is subtracted from the signal 32 received from the inductive channel 6. The result is a signal in which the bulk of the sent signal is eliminated. This way, after the subtraction, only the signal Data-2-out received from the other side remains. The same operation is done on the other side. This way a full duplex path is established without interference from the own sent signals. Of course there is some tolerance on this operation due to variations in the channel and the filter components. A preferred rejection of the unwanted signal is 10 to 20 dB.

Figure 3:
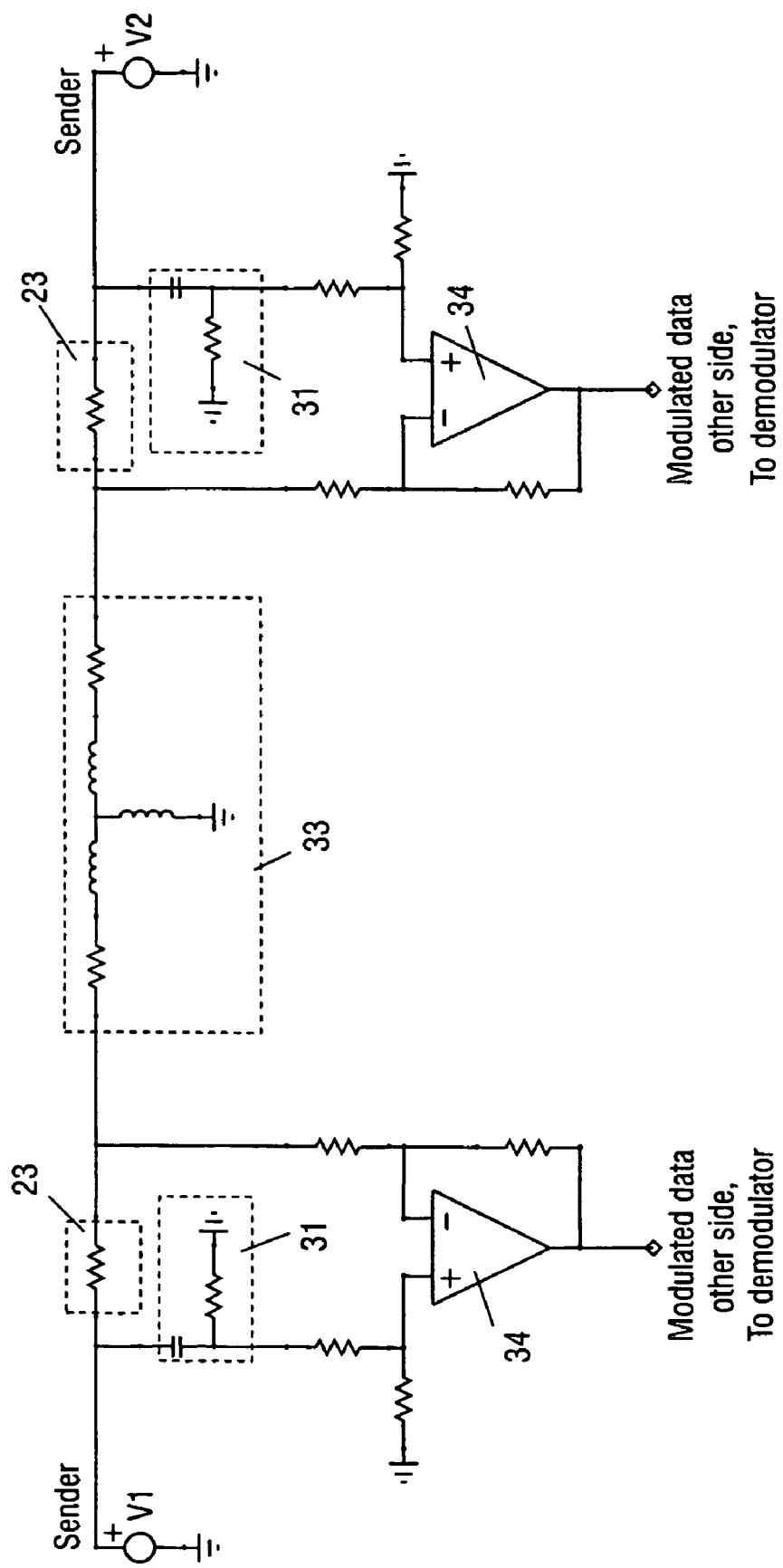
FIG. 3 illustrates a practical implementation of the schematic block diagram of FIG. 2.

FIG. 3 shows a practical implementation of this principle. The transfer from sender to transformer coupling or thus the transmission channel can (simplified) be replaced by a first order high-pass filter 33. This first order high-pass filter 33 is represented by a simple RC-circuit. The differential amplifier 34 at the bottom takes the difference between the signal at the transformer and the output of the compensation network 31. The coupling network 23 can be one resistor as shown in the diagram of FIG. 3.

The finally obtained signal, which is the signal in which the bulk of the sent signal is eliminated, goes through a synchronous detection scheme.

Synchronous Detection

The basic purpose of a synchronous detection scheme is amplitude detection in data channels. Since both data channels in the embodiment of the present invention described are amplitude modulated at two different frequencies, there will be two different synchronous detectors, one at each side of the transmission channel 6.

In alternative embodiments, not described in detail nor shown in the drawings, frequency demodulation or phase modulation can be performed, with corresponding demodulation schemes.

For synchronous detection, the detector on the stationary part in the present case has to detect the presence of a data signal modulated at the first modulation frequency, e.g. the 1.5 MHz signal, while the detector on the moving part has to detect the presence of a data signal modulated at the second modulation frequency, e.g. the 3 MHz signal.

The synchronous detector is chosen in the present invention because of its fast response and its high extinction ratio for frequencies which are an even factor such as 2 or more apart. This is also the reason why the first and the second modulation frequencies are chosen a factor 2 apart, e.g. 1.5 MHz and 3 MHz as in the example above. In principle synchronous detection is a frequency selective amplitude detection method. Other amplitude detection methods are also a possibility, like for example a combination of a band-pass filter and a peak or mean-value detector.

Figure 4:
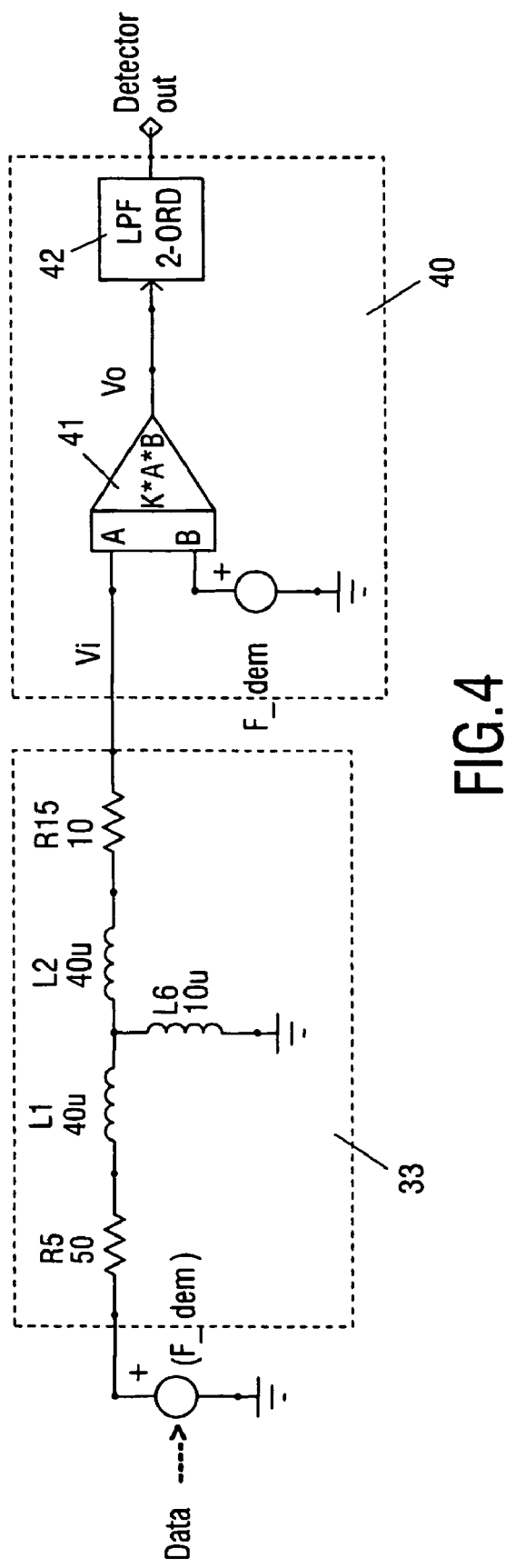
FIG. 4 illustrates the principle of synchronous detection.

A synchronous detector 40 can be used in an arrangement as shown in FIG. 4. The input signal to be detected should have the same frequency (modulation frequency) as the demodulation frequency used in the detector and a phase shift which is constant with respect to the demodulation frequency.

A signal received over the transmission channel 33 is multiplied with the 0 degree component of the detection or demodulation frequency and with the orthogonal 90 degree component of that detection or demodulation frequency.

Figure 5:
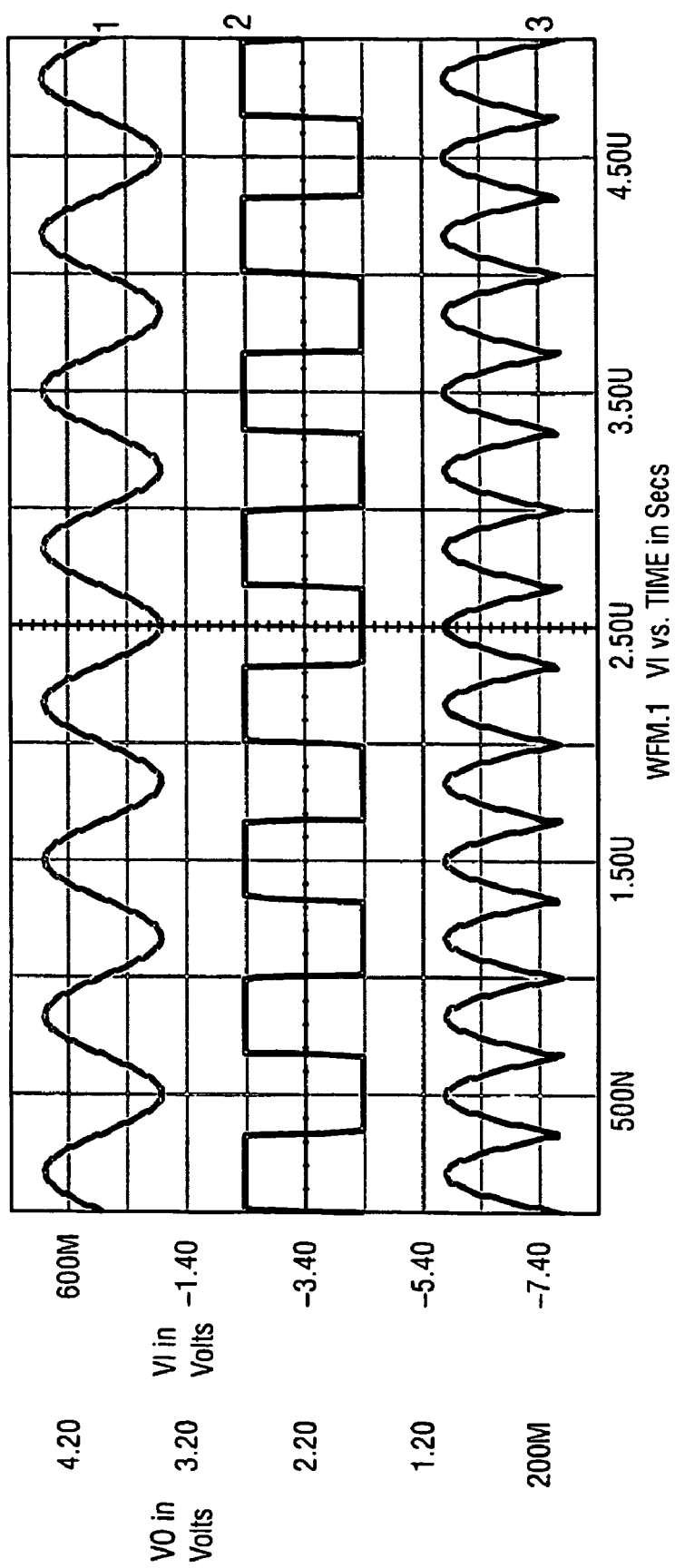
FIG. 5 illustrates that, in the special case when the phase difference between the input signal and the demodulation signal is exactly zero, a synchronous detector operates as a full wave rectifier.

In the special case which is shown in FIG. 5, when the phase difference between the received signal and the demodulation signal is exactly zero, it can be seen that under these conditions the synchronous detector 40 operates as a full wave rectifier.

If the phase difference is not zero, negative voltage time areas occur as well as positive voltage time areas and reduce the mean value of the output voltage so that it is always lower than that of the example shown in FIG. 5.

The output voltage $V_o$ of the detected signal will now be determined as a function of the phase.

The input voltage $V_i$ is multiplied by +1 or −1 in time with the demodulation frequency in a multiplier 41. This effect is presented mathematically as:

$$V_o = V_i \cdot S(t) \tag{1}$$

where $S(t)$ is −1 or +1.

If this is rewritten in Fourier series form, the following is obtained:

$$S(t) = \frac{4}{\pi} \sum_{n=0}^{\infty} \frac{1}{2n+1} \sin(2n+1)\omega_{dem} t \quad (2)$$

The input voltage $V_i$ is assumed to be a sinusoidal voltage having a frequency $f_i = m \cdot f_{dem}$ and a phase angle $\phi_m$. With equations (1) and (2) this leads to an output voltage $V_o$ $$V_o(t) = V_i(t) \sin(m\omega_{dem} t + \varphi_m) \cdot \frac{4}{\pi} \sum_{n=0}^{\infty} \frac{1}{2n+1} \sin(2n+1)\omega_{dem} t \quad (3)$$

The arithmetic mean value of this output voltage $V_o$ is evaluated by the subsequent low-pass filter 42, having the following equations $$\frac{1}{T}\int_0^T \sin(m\omega_{dem} t + \varphi_m) \cdot \sin(l\omega_{dem} t) \cdot dt = 0 \text{ for } m \neq 1$$

$$\frac{1}{T}\int_0^T \sin(m\omega_{dem} t + \varphi_m) \cdot \sin(l\omega_{dem} t) \cdot dt = \frac{1}{2}\cos(\varphi_m) \text{ for } m = 1$$

Combined with equation (3) the following final result is obtained:

$$V_o = \frac{2}{\pi m} \hat{V}_i \cdot \cos\varphi_m \text{ for } m = 2n+1 \quad (4)$$

$$V_o = 0 \text{ for } m \neq 2n+1 \quad (4)$$

where n=0, 1, 2, 3, . . .

If the input voltage signal $V_i$ comprises a mixture of frequencies, only those components contribute to the means value of the output voltage the frequencies of which are equal to the demodulation frequency or are an odd multiple thereof. This explains why the synchronous detector 40 is particularly suitable for selective amplitude measurements.

The synchronous detector is also phase sensitive since the output depends on the phase angle between the appropriate component of the input signal and the demodulation frequency. For $\phi_m = 90°$, $V_o$ is zero even if the frequency condition is fulfilled. For the example in FIG. 5, $\phi_m = 0°$ and m=1. In this case equation (4) yields:

$$\overline{V}_o = \frac{2}{\pi} \hat{V}_o$$

where $\overline{V}_o$ is the mean value of the signal and $\hat{V}_o$ is the peak value of the signal. Equation (4) thus yields the arithmetic mean of a full wave rectified sinusoidal voltage; a result which could have been deduced directly from FIG. 5.

Equation (3) has shown that only those input voltages $V_i$ whose frequencies are equal to the demodulation frequency or are odd multiples thereof contribute to the output voltage $V_o$. However, this holds only if the time constant of the low-pass filter 41 is infinitely large. In practice this is not possible and in the case of the present invention even not desirable, for if the cut-off frequency of the low-pass filter would be zero, the output voltage $V_o$ could not change at all.

Figure 6:
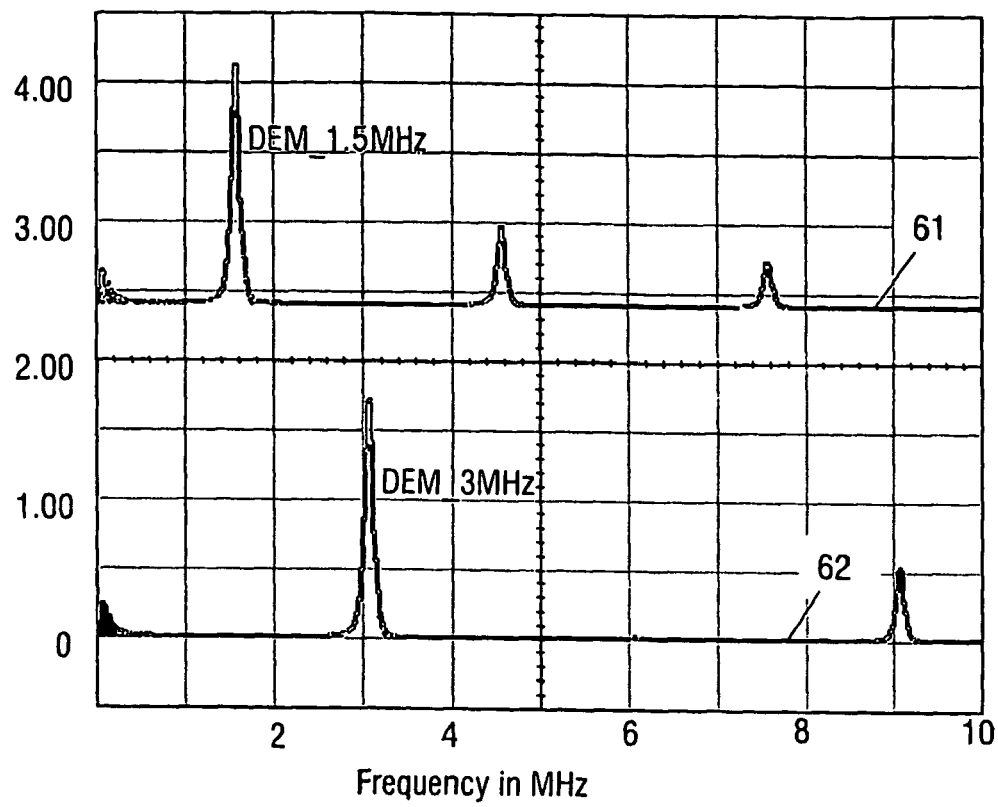
FIG. 6 is a graph of filtered characteristics, respectively for a detector set at 1.5 MHz and for a detector set at 3 MHz.

If the cut-off frequency is larger than zero, the synchronous detector no longer picks out discrete frequencies, but individual frequency bands. The 3 dB bandwidth of these bands is 2 $f_c$, and FIG. 6 shows the resulting filter characteristic. Two characteristics are shown. The upper trace 61 is the characteristic for a detector set at 1.5 MHz. The second trace 62 is the output of a detector set at 3 MHz. Clearly visible is that both detectors are insensitive to low-frequency disturbances and are also insensitive to frequencies which are a factor two higher than their demodulation frequency.

The contribution of the odd harmonics can optionally be eliminated by using a sinusoidal signal for the demodulation. In the present case this is not necessary, since only two frequency bands are possibly interfering. If the signal to be detected in a synchronous detection scheme is multiplied by a square signal, the detector will also generate an output at odd harmonic signals (see FIG. 6). In the case the signal to be detected would be multiplied with a sine signal the detector would not generate an output at odd harmonic frequencies. The circuit for this is more complex and more difficult to build, especially in the MHz range.

According to equation (4), the synchronous detector 40 does not produce the amplitude $V_{\_peak}$ directly, but gives the real part $V\_peak \cdot \cos \phi$ of the complex amplitude $V_i$. In order to determine the magnitude $|V_i|$=Vi_peak, the phase angle of the demodulation frequency can be adjusted by a suitable phase shift network, so that the output of the detector is maximum. The signal Vi(t) and the demodulator voltage $V_{dem}$(t) are then in phase, and the following is obtained:

$$\overline{V}_o = \frac{2}{\pi} \hat{V}_i$$

Since only the amplitude of the frequency component is important and not its phase angle, synchronisation between the phases of the demodulator and the input signal $V_i$ is not a necessity.

Figure 7:
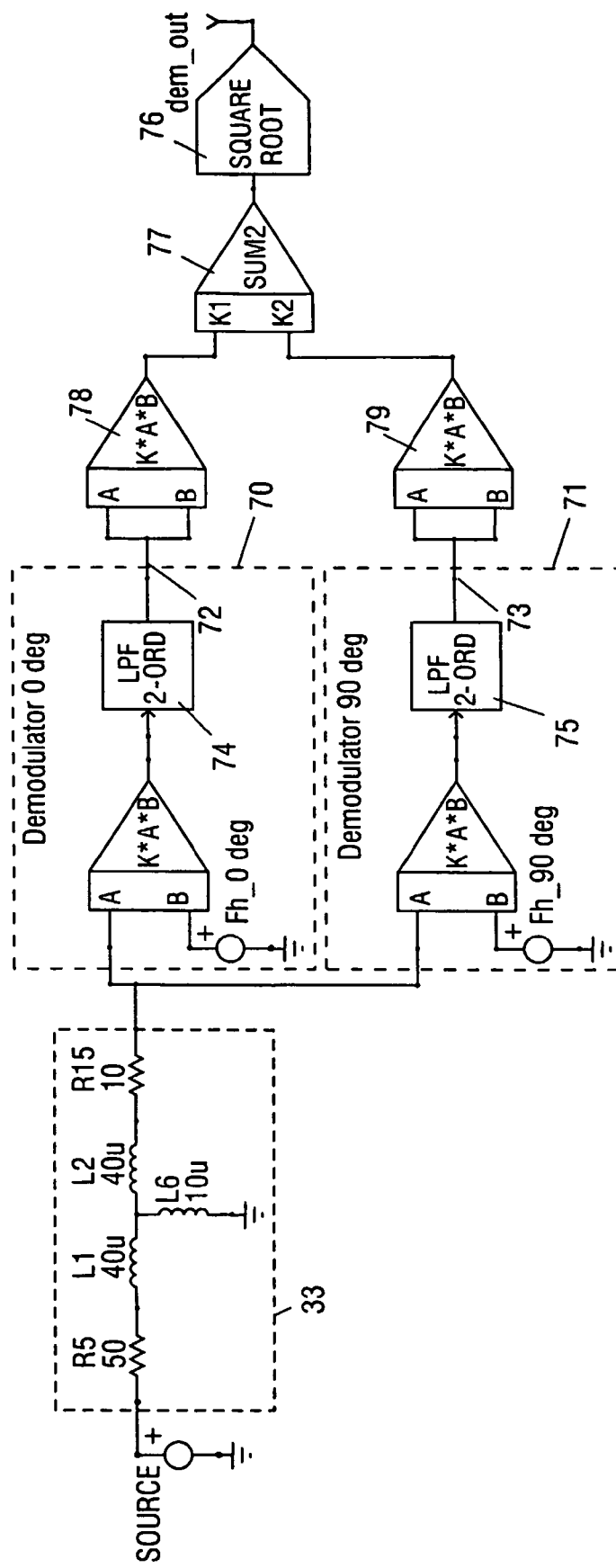
FIG. 7 is a schematic block diagram of two synchronous detectors used in parallel, according to an embodiment of the present invention.

In this case two synchronous detectors 70, 71 can be used in parallel as shown in FIG. 7. The two demodulator signals 72, 73 have an unknown phase with respect to the input signal $V_i$, but have a fixed phase difference of 90° with respect to each other.

After the two low-pass filters 74, 75, the amplitude of the in phase component and the orthogonal component is found. In order to generate the absolute value of the demodulated frequency component in the input signal $V_i$, the square root has to be taken, see block 76, of the sum, see block 77, of the squares, see blocks 78 and 79 of the two demodulator outputs 72, 73.

Figure 8:
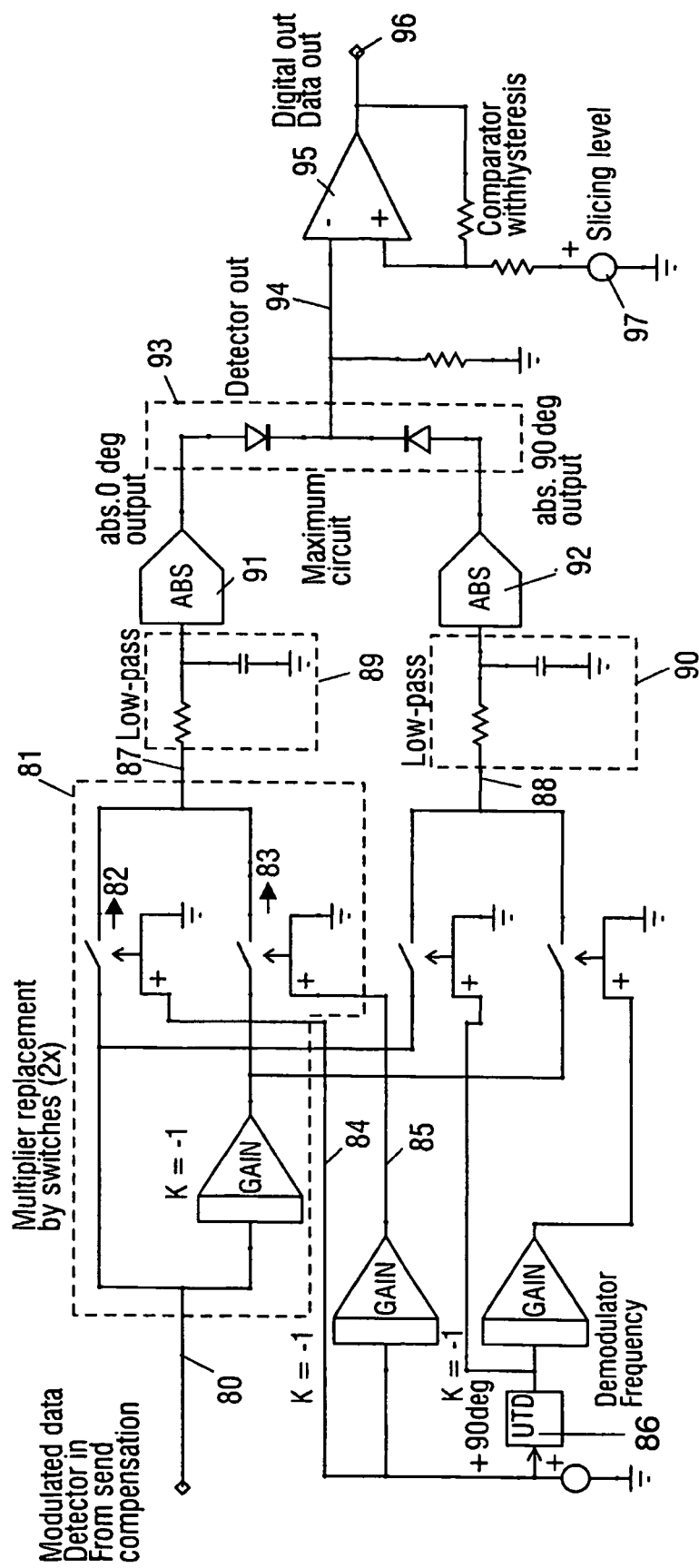
FIG. 8 shows an embodiment of a practical implementation of the schematic diagram of FIG. 7.

The operations of squaring (blocks 78 and 79) and square-root (block 76) require a lot of circuitry. A more simple approach, which results in an output signal which is good enough for adequate detection, is taking the highest value of the absolute value of the two demodulator outputs 72, 73. This operation is shown in the practical implementation circuit diagram of FIG. 8.

The diagram shows a multiplier implementation with a number of switches. Since the signal 80 to be detected has to be multiplied by +1 or −1, this function can easily be implemented via switching means 81 for switching between the inverted and non-inverted signal. In the upper part which detects the 0 degree component, one of the two switches 82, 83 is always selected by the regular demodulator signal 84 and the inverted demodulator signal 85. For the 90 degree detector channel the same operation is performed, but now with a demodulator signal shifted over 90 degree in a shifting means 86. The two outputs 87, 88 pass through a low-pass filter 89, 90 followed by an absolute value circuit 91, 92. Via a diode circuit 93 the highest of the two channels is transferred to a detector output 94. This still analog signal is transferred to a comparator 95 which will regenerate the data at the output 96. At the input of the comparator 95 the detector output 94 is compared with a slicing level 97: signals at the detector output 94 which are higher than the slicing level 97 will result in a first binary value, for example "zero", signals at the detector output 94 which are lower than the slicing level 97 will result in a second binary value, for example "one". In order to be insensitive to noise, the comparator 95 preferably has a certain amount of hysteresis.

An Implementation of the System

Figure 9:
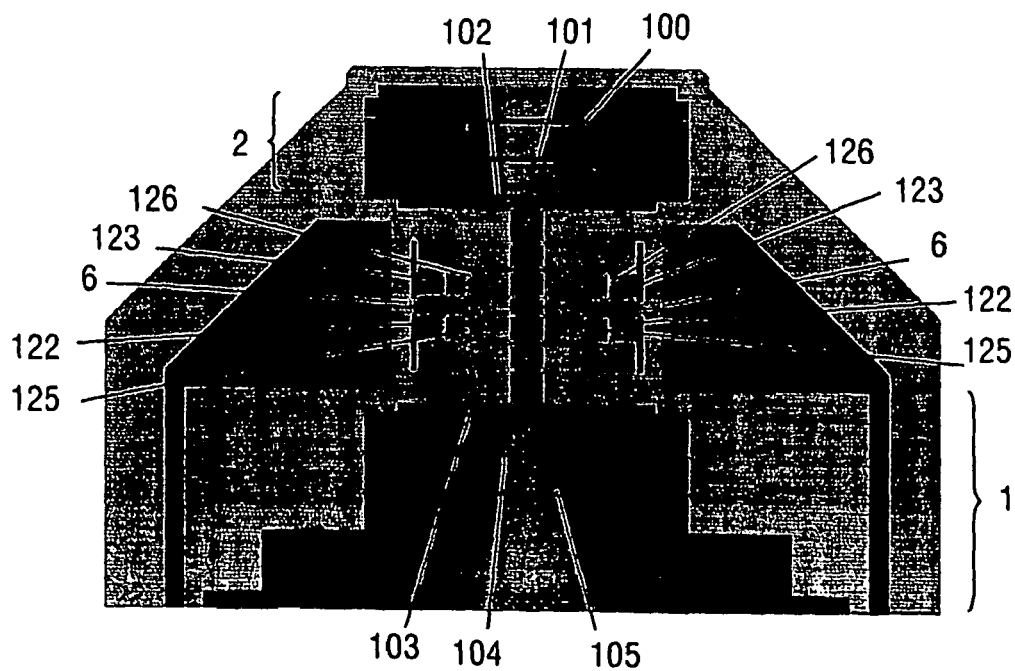
FIG. 9 illustrates a cross-section of a transmission system according to an embodiment of the present invention.

FIG. 9 shows a cross-section of an embodiment of an implementation of a coupling system according to the present invention.

In this system, the upper part is the moving part 2 located on the moving device, for example on the rotating part of a wheel. The lower part is the stationary part 1.

In the moving part 2, there is at least one PCB (printed circuit board), in the example illustrated there are three PCB's 100, 101, 102. A first PCB 100 collects sensor signals and transfers those to a second PCB 101. The second PCB 101 houses a controller 13 for performing signal processing. A third PCB 102 provides functions like power rectification 8 and conditioning 9, as well as the functions like modulation 15 and demodulation 24 of the data with the associated filters. In the example given there are three PCBs 100, 101, 102, but any other suitable number of PCBs can also be used, either more or less. For example all functions might be brought together on one and the same PCB.

In the stationary part 1, there are also three PCBs 103, 104, 105, which are similar to the PCBs 100, 101, 102 in the moving part 2. Here again, the number of PCBs may be different, such as one or more. The number of PCBs in the stationary part 1 does not need to be the same as the number of PCBs in the moving part 2. In the embodiment illustrated in FIG. 9, the upper PCB 103 of the stationary part 1 contains the functions for sensor detection such as speed detection, the power driver for the first frequency, e.g. 20 kHz, and the modulation circuitry 21 and demodulation circuitry 18 with the associated filtering. The second PCB 104 contains a controller 20 for performing signal processing. The first PCB 105 collects the sensor signals and transfers those to the second PCB 104. It also has the connection to the board computer, for example via a CAN (Controller Area Network) interface as is well known to the skilled person.

In between the stationary part 1 and the rotating part 2 are the cores 4, 5 and coils 122, 123, 125, 126 for the energy and data transfer. It consists of a potcore type construction 18 with on each side one coil 122, 123 for the power transfer and one coil 125, 126 for the data transfer. A potcore is the name of a standard type ferrite core for coils or transformers. FIG. 10 is one half of a potcore, a circular coil is in this case surrounded by ferrite on the inside and on the outside. The data coils 125, 126 are preferably located at the inside, which guarantees the most constant transfer in the data channel. The power coils 122, 123 have larger diameters and are located close to the teeth 106 in the outer rim of the cores 107 (see FIG. 10).

The wheel angle or speed sensing is performed via the modulation of the power signal. When the teeth 106 of the stationary core 4 and the teeth of the rotating core 5 are aligned, the magnetic gap is at a minimum, therefore there is maximum magnetic coupling between the coils from the primary and secondary side and the transferred power is at its maximum. When the teeth 106 are not aligned, there is a minimum magnetic coupling and the transferred power is at its minimum.

This power modulation can be measured via a current of the power coil 122.

In an embodiment of a core which can be used according to the present invention, there may be 40 teeth 106. This results in 40 power variations and therefore 40 pulses per revolution. The magnetic interface is thus built such that the couple factor varies 40 times per revolution. This causes a variation in the transferred power, which is measured and transferred to a pulse signal with a period of 40 times per revolution. This signal is transferred to the controller, which sends the signal to the board computer. The board computer may use such signals for a variety of purposes of which ABS-type functions (anti-blocking system) are only one example.

The data coil 125, 126 and power coil 122, 123 are located in the gap between the inner core 108 and the outer coil wall 109.

Figure 11:
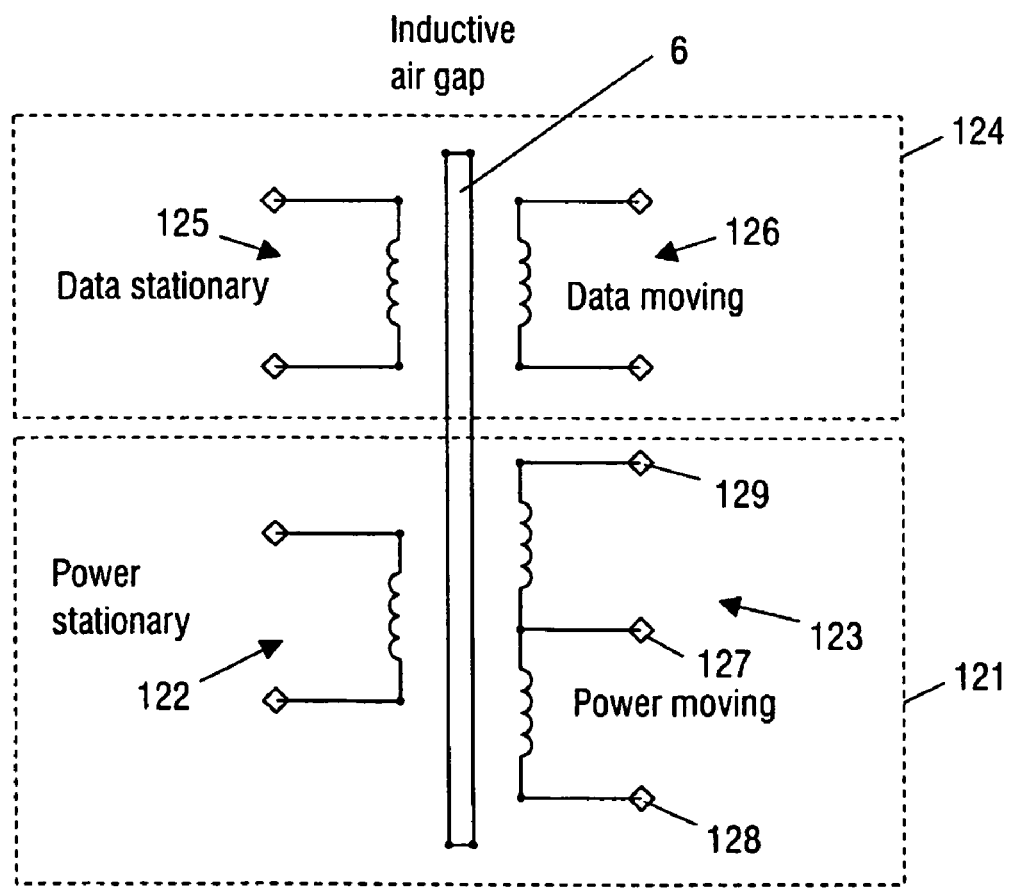
FIG. 11 illustrates the transformer wiring according to an embodiment of the present invention.

The transformer wiring is as in FIG. 11 and as explained above.

It is to be understood that although preferred embodiments, specific constructions and configurations, as well as materials, have been discussed herein for devices according to the present invention, various changes or modifications in form and detail may be made without departing from the scope and spirit of this invention.

The invention claimed is:

1. An inductive transmission system for inductive transmission of power and full duplex data signals between a first device and a second device, comprising:
   a bidirectional inductive channel between the first device and the second device,
   first transmission means for transmitting a power signal at a first frequency from the first device to the second device over the inductive channel,
   a first modulating device for modulating a first data signal at a first modulation frequency,
   a second modulating device for modulating a second data signal at a second modulation frequency,
   second transmission means for transmitting the modulated first data signals from the first device to the second device over the inductive channel, and for transmitting the modulated second data signals from the second device to the first device over the inductive channel,
   wherein the first modulation frequency and the second modulation frequency are an even factor apart, wherein the transmission system furthermore comprises detection means for demodulating the first data signal at the first device and demodulating the second data signal at the second device and signal cancellation means for cancellation of the first data signal from the second data signal received at the first device and cancellation of the second data signal from the first data signal received at the second device.

2. The inductive transmission system according to claim 1, wherein the first modulating device and the second modulating device are suitable for performing amplitude modulation.

3. The inductive transmission system according to claim 1, wherein the detection means are synchronous detection means.

4. The inductive transmission system according to claim 1, wherein the first frequency is a factor 10 or more apart from the first and second modulation frequency.

5. The inductive transmission system according to claim 1, wherein the first transmission means comprises a first coil at the first device and a first coil at the second device.

6. The inductive transmission system according to claim 1, wherein the second transmission means comprises a second coil at the first device and a second coil at the second device.

7. A method for inductive transmission of power and full duplex data signals between a first device and a second device, comprising the acts of:

- transmitting power signals from the first device to the second device at a first frequency over an inductive channel,
- transmitting first data signals modulated at a second frequency from the first device to the second device over the inductive channel,
- transmitting second data signals modulated at a third frequency from the second device to the first device over the inductive channel, the second and third frequency being an even factor apart,
- demodulating the first data signal and the second data signal on the first device side respectively second device side,
- demodulating the second data signal at the second device,
- canceling the first data signal from the second data signal received at the first device at the first device respectively second device, and
- canceling the second data signal from the first data signal received at the second device.

8. The method according to claim 7, comprising amplitude modulating the first data signals and the second data signals before transmission.

9. The method according to claim 7, wherein demodulating the first data signal and the second data signal comprises performing synchronous detection.

10. The inductive transmission system of claim 1, further comprising a high pass filter between the first device and the second device, the high pass filter being configured to eliminate the first frequency out of a data channel used for exchange of the first data signal and the second data signal.

11. The inductive transmission system of claim 1, further comprising a high pass filter configured to filter at least one of the first data signal and the second data signal to eliminate the first frequency.

12. The inductive transmission system of claim 11, wherein the high pass filter passes frequencies above 500 Khz.

13. The method of claim 7, further comprising the act of filtering at least one of the first data signal and the second data signal to eliminate the first frequency.

14. The method of claim 13, wherein the filtering act passes frequencies above 500 Khz.

* * * * *